Figure 1:
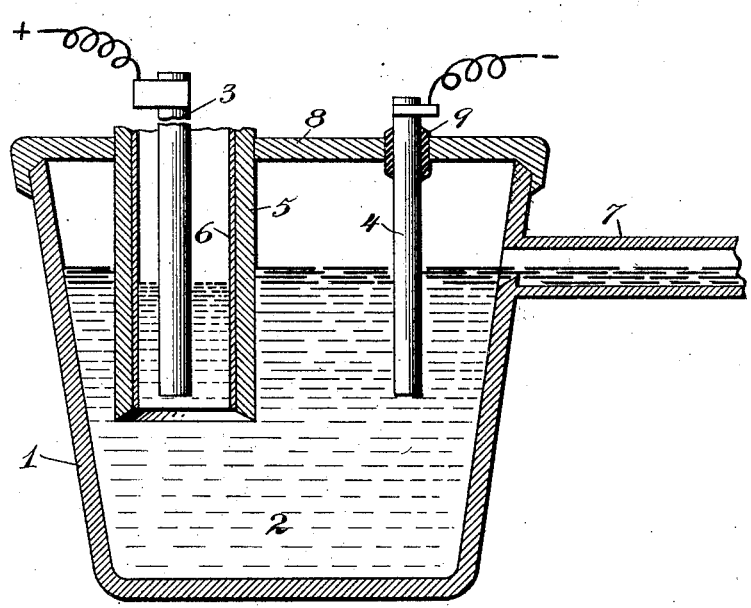

J. E. BUCHER.
METHOD OF FIXING NITROGEN.
APPLICATION FILED MAY 12, 1913.

1,113,599.

Patented Oct. 13, 1914.

Witnesses:
Charles O. Laurin
Ethel M. Jordan

Inventor:
John E. Bucher
by Chas P Hidden
his attorney.

UNITED STATES PATENT OFFICE.

JOHN E. BUCHER, OF COVENTRY, RHODE ISLAND, ASSIGNOR TO NITROGEN PRODUCTS COMPANY, A CORPORATION OF RHODE ISLAND.

METHOD OF FIXING NITROGEN.

1,113,599.   Specification of Letters Patent.   Patented Oct. 13, 1914.

Original application filed August 8, 1911, Serial No. 642,918. Divided and this application filed May 12, 1913. Serial No. 767,227.

*To all whom it may concern:*

Be it known that I, JOHN E. BUCHER, a citizen of the United States, and resident of Coventry, in the county of Kent and State of Rhode Island, have invented certain new and useful Improvements in Methods of Fixing Nitrogen, of which the following is a specification, this application being a division of the application filed by me August 8, 1911, Serial No. 642,918.

This invention relates to the fixation of nitrogen and more particularly to an improved process for producing ammonia, with the formation of commercially valuable by-products incident thereto.

The process in question is cyclic in character and involves the electrolytic production of a metal capable of combining with free nitrogen to form a nitrid from a salt of such metal, the combination of the electrolytically produced metal with nitrogen and the reacting upon the nitrid so formed with a suitable reagent to form ammonia or a compound thereof and preferably to re-form the original salt. The energy consumed in fixing the nitrogen is, hence, for the most part that employed in the electrolytic step of the process and it is desirable that a salt of such character be used in the initial operation as will readily yield to electrolytic action with a minimum expenditure of electric energy and afford a metal readily capable of forming a nitrid. With such a metal as calcium or magnesium, the nitrid may be formed at a temperature approximating a dull red heat, and hence such metals are of special value in connection with my process.

The haloid salts are preferred for use in the initial step of my cycle process, and the nature of the by-product or by-products sought will determine whether a chlorid, bromid, iodid, or a mixture thereof shall be used.

Many attempts have been made to utilize the chlorin of common salt, used in the ammonia-soda process, for producing bi-carbonate and carbonate of soda. Solvay and Mond made many experiments with this end in view but up to the present time none have proven economically successful.

The common practice of today allows all of the undecomposed common salt, which amounts to about 30 per cent. of the total quantity used, and much of the chlorin of the decomposed salt to go to waste, some of the chlorin combined with calcium being recovered and utilized as calcium chlorid.

My invention renders possible the saving and utilization of all of the undecomposed common salt, and substantially all of the chlorin of the salt which becomes decomposed, while furthermore resulting in an increase of approximately one third of the quantity of ammonia present in the cycle.

The manner of conducting my process in connection with the ammonia-soda industry is as follows: The mother liquor from the crude bi-carbonate of soda produced in the carbonating tower is evaporated to dryness in any suitable evaporator; and the free or volatile ammonia is collected by brine in the usual manner; a residue consisting essentially of a mixture of dry ammonium chlorid and sodium chlorid being obtained. This mixture is then heated to the subliming point of ammonium chlorid, to wit, about 300° C., and the ammonium chlorid is condensed to a solid sublimate leaving the sodium chlorid behind in an especially pure condition, suitable for any use, such as table salt, or for strengthening the brine used in the ammonia-soda process; while all of the ammonia corresponding to the decomposed sodium chlorid is thus recovered in the form of dry ammonium chlorid. The ammonium chlorid is then brought into contact with a nitrid at the proper temperature, usually a dull read heat. Many nitrids are capable of reacting with ammonium chlorid, in practically all cases with evolution of heat, producing ammonia or ammonium chlorid and a chlorid of the metallic base of the nitrid. For example, calcium nitrid reacts, in this connection as follows:

(1)   

The reaction in this case evolves sufficient heat to maintain itself after it has once been started, and if moisture be excluded, which is preferable, the reaction takes place quantitatively and anhydrous ammonia and anhydrous calcium chlorid are produced.

The ammonia needs only to be cooled and compressed, either by the pressure produced in the generator, or by mechanical compression, to immediately liquefy it. The calcium chlorid hereby produced is well suited to serve as an electrolyte in an electric furnace, and is preferably so used in the electrolytic step of the process leading to the re-formation of calcium nitrid.

A characteristic property of nitrates of the metals and metalloids—lithium, magnesium, calcium, barium, strontium, aluminium, silicon, etc., and of boron nitrid, is their power to decompose water at the ordinary, or at more or less elevated temperatures, as the case may be, to form gaseous ammonia, and a hydroxid or oxid of the metal or metalloid.

This method of producing ammonia is not economical because the oxid or hydroxid remaining has little value as such, and must at any reasonable temperature, short of that of the electric furnace, be reduced to the metallic state before it can absorb nitrogen to re-form the nitrid, and it is very much more difficult and expensive to reduce the oxids and hydroxids of the nitrid forming metals than to reduce the haloids of said metals.

I have discovered that not only do practically all of the nitrids react chemically with the mineral acids, but that they also react with some other hydrogen compounds such as the acid salts, ammonium salts (an instance of which latter has been previously given) etc. As an example of such a reaction involving an acid salt, I may instance the formation of ammonia and magnesium carbonate, or oxid, according to the following equations:

(2) 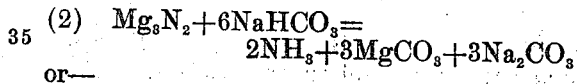

or—

(3) 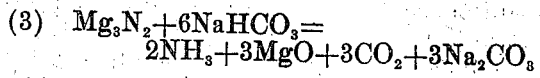

while as further examples of reactions involving haloid salts, the base member of which is ammonium, I may cite:

(4) 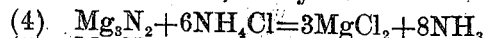
(5) 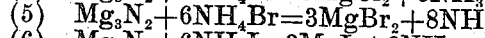
(6) 

The foregoing instances will serve to show the value and importance of the nitrids as used in connection with my process. As the process is cyclic in character, the method of re-forming the nitrid or nitrids used, from the haloid salt or salts produced as per the foregoing, may next conveniently be described. As intimated above, an electrolytic furnace of any well known type is employed in this connection, the salt being fused at the proper temperature and being electrolytically decomposed, the base member being deposited out and the halogen constituent being liberated, usually in gaseous form.

Mixture of salts may be utilized in the furnace, as for example magnesium chlorid may be mixed with sodium chlorid. Further the magnesium or other metal may be separated as such, or it may be alloyed with a heavy base metal such as lead, tin, antimony, or mixture of these, or similar metals. In any case, the metal or metals whether deposited as such or alloyed with other metals, must be capable of uniting with free nitrogen to form a nitrid or nitrids.

I have found it possible to use lithium, magnesium, calcium, strontium, barium, aluminum, titanium, and the metalloids—silicon and boron; but prefer to use calcium chlorid or magnesium chlorid as the haloid salts, because of the abundance and cheapness of these materials, and the particular facility with which they combine with nitrogen to form nitrids. However, while I prefer calcium and magnesium, I do not confine myself to any particular nitrid forming element, nor to the use of any specific non-metallic element or group of elements to combine with it, e. g., the iodids, bromids, oxids, or similar compounds which may be electrolyzed.

The gaseous halogen given off during electrolysis is in condition to be utilized in the usual ways, as by absorption with lime to form bleaching powder, or by compression and cooling to liquefaction. It may also be utilized for the production of oxygen, etc., by absorbing it in milk of lime in the presence of a catalytic agent.

Referring to equations 1, 4, 5, and 6, it will be noted that the ammonium is therein, in each case, uncombined after the respective reactions have been effected. By supplying an excess of the halogen free or in the form of acid during the course of these reactions, a salt of ammonia may be formed. Thus if, for example, magnesium chlorid be electrolyzed, depositing metallic magnesium and liberating chlorin gas; this latter may be brought into contact with hydrogen forming hydrochloric acid, and this in turn may be caused to react with the magnesium nitrid formed from the deposited metal, thus:

(7) 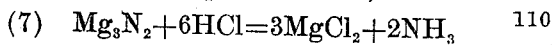

Using an excess of hydrochloric acid, the reaction is as follows:

(8) 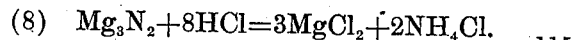

Thus we may readily obtain a supply of the ammonium chlorid used as per equation 4; the magnesium chlorid being separated from the ammonium chlorid by sublimation and the magnesium chlorid being then electrolyzed as above. The metal or alloy produced simultaneously with the halogen is brought into contact with pure nitrogen at the proper temperature, generally a red heat, producing a nitrid of the nitrid forming metal, which nitrid may then be utilized in the ways above set forth.

To summarize briefly the foregoing operations last mentioned: A haloid salt of a metal capable of forming a nitrid is electrolyzed to deposit the metal and liberate the halogen element of the salt. The gaseous halogen may be utilized for various purposes but is preferably treated with hydrogen to form an acid. The nitrid forming metal is united with nitrogen, and the so formed nitrid is treated with the acid aforesaid, yielding an ammonium-halogen compound and a haloid of the nitrid forming metal. These salts are separated, in the manner above described, which method of separation I regard as of considerable importance and believe the same to be distinctively novel in the connection set forth. Finally a quantity of the so formed nitrid is caused to react with the separated halogen salt to form ammonia and to reform the haloid salt of the nitrid forming element, thus completing a cycle of the process.

I have described my process in detail with reference to the ammonia-soda industry, but it is evident that the same principles are applicable to other industries, as is evidenced by the following equation:

(9) $Ca_3N_2 + 6HCl = 2NH_3 + 3CaCl_2$

Electrolysis of the so produced chlorid of calcium gives chlorin and calcium, and the former may be utilized as such, or may be used to form hydrochloric acid, while the calcium may be converted into calcium nitrate to be reacted upon by hydrochloric acid. My process is hence adapted to any industry wherein hydrochloric acid is available or wherein it may be produced.

The cyclic process may also be carried out in other ways, e. g., water may be used and anhydrous ammonia obtained, as is shown by the following equations:

(10) $Mg_3N_2 + 3H_2O = 3MgO + 2NH_3$
(11) $Ca_3N_2 + 3H_2O = 3CaO + 2NH_3$

The oxids so produced, can then be converted into chlorids by methods such as are set forth in the following equations:

(12) $MgO + Cl_2 + C = MgCl_2 + CO$ or—

(13) $CaO + H_2O + Cl_2 = CaOCl_2 + H_2O$ the reaction per equation 12 being effected at a strong red heat.

Upon heating, the calcium compound loses its oxygen content, thus:

(14) $2CaOCl_2 + heat = 2CaCl_2 + O_2$ completing the cycle. Also, the magnesium oxid may be electrolyzed to magnesium and oxygen and the magnesium thus produced combined with nitrogen to complete the cycle by forming the nitrid.

The magnesium oxid may, if desired, be treated with hydrogen and chlorin or with hydrochloric acid to re-form the magnesium chlorid, thus:

(15) $MgO + H_2 + Cl_2 = MgCl_2 + H_2O$
(16) $MgO + 2HCl = MgCl_2 + H_2O$ completing the cycle. Or the magnesium oxid may be heated with ammonium chlorid to re-form the magnesium chlorid, thus:

(17) $MgO + 2NH_4Cl = MgCl_2 + NH_3 + H_2O$ completing the cycle.

The carbon monoxid of equation 12 may be formed at or even somewhat below a red heat and it may be converted into carbon dioxid by burning it in oxygen or air. In the latter case free nitrogen may be obtained by absorbing the carbon dioxid in any of the well known manners, and this free nitrogen may be converted into ammonia in the manner above described, while the carbon dioxid may be used in the carbonating towers of the ammonia-soda process. That it is thus possible to form pure carbon dioxid in connection with said process is of great value, since it renders possible the use of smaller carbonating towers, thereby increasing the efficiency of production as a whole.

The waste nitrogen of the ammonia-soda industry from the carbonating towers may also be used in the above cyclic process. From an economic standpoint therefore my present process is admirably adapted to supplement many now in use, or it may be operated to advantage independently.

In view of the variety of applications to which my invention may be applied I desire it to be understood that I do not wish to be limited except by the scope of the appended claims. In the said claims such an expression as "a substance comprising ammonia" is to be regarded as being of sufficient breadth to cover ammonia and all compounds thereof. Similarly I regard the term "nitrogenous reagent" as being applicable to nitrogen or any compound of such element; while the term "light metal" is intended to embrace such metals as the alkali metals, alkaline earth metals and aluminum.

In the accompanying drawing which forms a part hereof I have shown suitable apparatus in which my novel process may be effectuated. It is obvious however that this is only by way of exemplification and I do not desire to be limited thereto in any particular.

Figure 2:
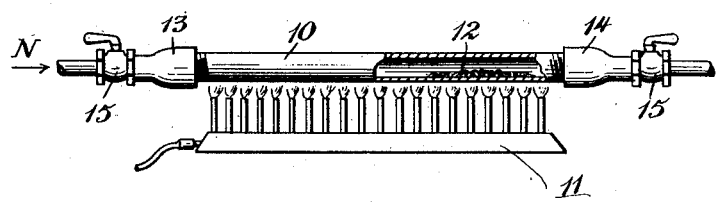

Referring to said drawings: Figure 1 is a vertical cross-section of an electrolyzing apparatus wherein the salt of the nitrid forming metal, e. g. magnesium chlorid, may be dissociated to liberate said metal. Fig. 2 is a somewhat diagrammatic representation of a reaction tube or retort wherein the nitrid forming metal may be reacted upon with a nitrogenous reagent to form a nitrid. This reaction tube further serving, if desired, as a receptacle wherein to effect other reactions involved in the process.

In Fig. 1, the pot or receptacle 1, may be of iron or other suitable material, and contains a mass of fused salt 2, into which project the positive pole electrode 3 and the negative pole electrode 4. These latter may be of any suitable description and material or materials. The electrode 3 is preferably inclosed in part at least by a tube or pipe 5, of iron for example, which should be lined with a suitable protective lining 6. The electrode 4, of course, need not be so protected.

When direct current is passed through the bath from 3 to 4, the salt of which the bath is composed will be decomposed, chlorin, for example, being liberated at the electrode 3 and thence escaping through the tube 5; while the metal, e. g. magnesium will first be deposited at or adjacent to the electrode 4. When a sufficient quantity of the nitrid forming metal has been accumulated it may be withdrawn from the cell or pot 1 via the pipe 7.

The pot is provided with a suitable cover 8, which should be air tight, and the electrode 4 may be insulated from this cover by an insulating bushing 9.

The metal withdrawn from pipe 7 may be introduced into the reaction tube 10, which latter may be heated in any suitable manner as by a number of Bunsen burners 11.

The magnesium 12, for example, in the retort or reaction tube is converted to a nitrid by passing nitrogen or a suitable nitrogenous reagent, e. g., free nitrogen, through the tube, such reagent passing thereinto from a tube or pipe 13, and the unused portion of the same escaping via tube 14. Cocks or valves 15 may be provided in these last mentioned pipes.

The halogen, e. g. chlorin escaping from pipe 5, is collected and may be combined with hydrogen, for example, to form hydrochloric acid; and when the nitrid of magnesium, for instance, in tube 10, is reacted upon with said acid, which may be introduced into said tube in any suitable manner, as by injection, at a stage in the process substantially as previously described (equations 7 and 8), the ammonia formed may escape through tube 14 while the resulting reformed haloid salt will remain in the reaction tube, from which it may be afterward removed preparatory to again electrolyzing the same.

Having thus described my invention what I claim is:

1. The cyclic method of fixing nitrogen which comprises electrolyzing a haloid salt of a metal capable of forming a nitrid, reacting upon the said electrolytically separated metal with a nitrogenous reagent to form a nitrid, treating said nitrid with a hydrogen compound to form a substance comprising ammonia and a compound the base of which is the metal aforesaid, and reacting upon said compound with at least one reagent to reform the haloid salt above referred to said one reagent being halogenous in character.

2. The method of fixing nitrogen which comprises electrolyzing a haloid salt of a metal capable of forming a nitrid, reacting upon the said electrolytically separated metal with a nitrogenous reagent to form a nitrid, treating said nitrid with a hydrogen compound to form a substance comprising ammonia and a compound the base of which is the metal aforesaid, and reacting upon said compound with at least one reagent to form a haloid salt the base of which is the metal first mentioned, said one reagent being halogenous in character.

3. The method of fixing nitrogen which comprises electrolyzing a salt of a metal capable of forming a nitrid, reacting upon the said electrically separated metal with a nitrogenous reagent to form a nitrid, treating said nitrid with water to form ammonia, and reacting upon one of the residues of this last reaction, other than said ammonia, with at least one additional reagent to form an electrolyzable salt the base of which is the metal first mentioned.

4. The method of fixing nitrogen which comprises electrolyzing a salt of a metal capable of forming a nitrid, reacting upon the said electrically separated metal with a nitrogenous reagent to form a nitrid, treating said nitrid with a reagent which includes water forming constituents to form a substance comprising ammonia, and reacting upon one of the residues of this last reaction with at least one additional reagent to form an electrolyzable salt the base of which is the metal first mentioned.

5. The cyclic method of fixing nitrogen which comprises electrolyzing a haloid salt of a metal capable of forming a nitrid, reacting upon the said electrolytically separated metal with a nitrogenous reagent to form a nitrid, treating said nitrid with a hydrogen compound to form a substance comprising ammonia and also an oxygen compound of said metal, and converting said oxygen compound to a simple halogen compound of said metal preparatory to re-electrolyzation of the latter.

In testimony whereof I have affixed my signature, in the presence of two witnesses.

JOHN E. BUCHER.

Witnesses:
 HOWARD C. RIPLEY,
 NORMAN E. HOLT.